(12) United States Patent
Greive

(10) Patent No.: US 6,189,684 B1
(45) Date of Patent: Feb. 20, 2001

(54) SHEET CONVEYOR BELT

(75) Inventor: Martin Greive, Schönau (DE)

(73) Assignee: Heidelberger Druckmaschinen Aktiengesellschaft, Munich (DE)

(*) Notice: Under 35 U.S.C. 154(b), the term of this patent shall be extended for 0 days.

(21) Appl. No.: 09/221,086

(22) Filed: Dec. 24, 1998

(30) Foreign Application Priority Data

Dec. 24, 1997 (DE) ............................................ 197 57 926

(51) Int. Cl.⁷ .................................................. B65G 23/04
(52) U.S. Cl. .................... 198/835; 198/860.3; 198/861.3
(58) Field of Search ............................. 198/835, 861.3, 198/860.3, 807, 810.03

(56) References Cited

U.S. PATENT DOCUMENTS

| | | | |
|---|---|---|---|
| 3,291,287 | * 12/1966 | Rehm | 198/835 |
| 4,693,363 | * 9/1987 | Kuehnert | 198/807 |
| 5,022,514 | * 6/1991 | Lofberg | 198/861.3 |
| 5,101,980 | * 4/1992 | Arvidson | 198/810.03 |
| 5,503,265 | * 4/1996 | Hussar et al. | 198/810.03 |
| 5,871,085 | * 2/1999 | Yagi | 198/835 |

FOREIGN PATENT DOCUMENTS

| | | | |
|---|---|---|---|
| 862430 | * 2/1971 | (CA) | 198/835 |
| 002273692 | * 6/1994 | (GB) | 198/835 |
| 0059111 | * 4/1983 | (JP) | 198/860.3 |
| 0002511 | * 1/1985 | (JP) | 198/860.3 |

\* cited by examiner

*Primary Examiner*—Robert P. Olszewski
*Assistant Examiner*—Steven B. McAllister
(74) *Attorney, Agent, or Firm*—Herbert L. Lerner; Laurence A. Greenberg; Werner H. Stemer

(57) ABSTRACT

A device for conveying printing substrates includes a frame, a plurality of spaced-apart and axially parallel cylindrical rollers supported on the frame, one of the rollers being a rotatably drivable drive roller, and the other rollers being freely rotatably supported, and an endless conveyor belt wrapped around all of the rollers and in operation being in frictional contact with the drive roller, two of the rollers being relatively closely adjacent one another, being spaced apart from one another a distance selected from the group thereof consisting of less than and not considerably greater than the diameter of the drive roller; the drive roller being movable in a direction towards and away from the two spaced apart rollers; and including a retaining device for firmly retaining the drive roller in an operating position wherein an outer side of the conveyor belt rests on the drive roller, the conveyor belt being wrapped around the drive roller over an angle on the order of magnitude of 180°, while the other rollers are in engagement with an inner side of the conveyor belt; and a free space provided on one side of the conveying device for retracting the conveyor belt in axial direction away from the rollers.

10 Claims, 5 Drawing Sheets

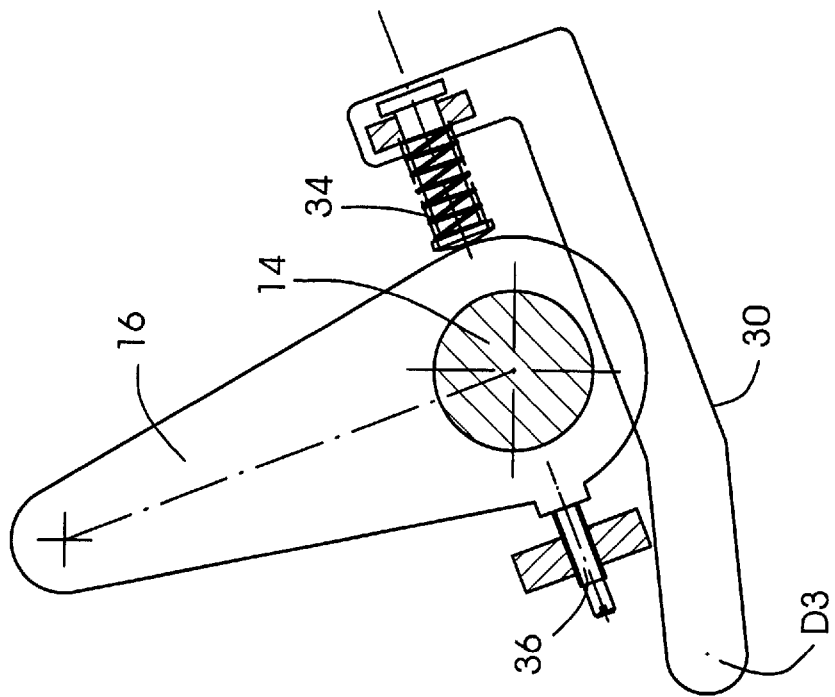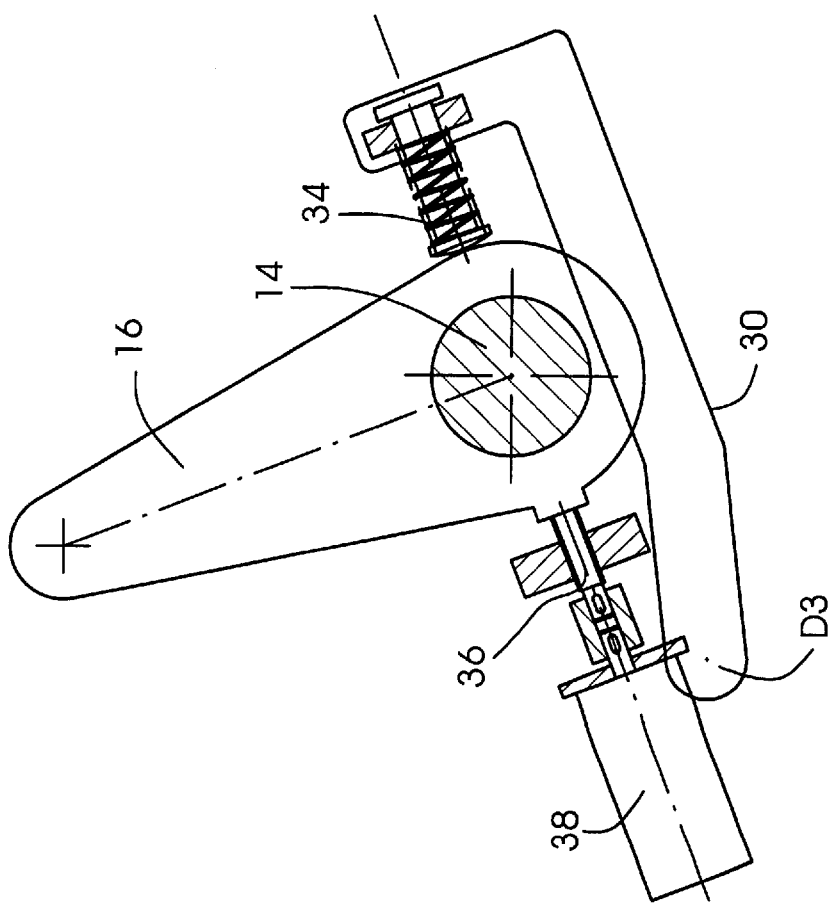

SHEET CONVEYOR BELT

BACKGROUND OF THE INVENTION

FIELD OF THE INVENTION

The invention relates to a sheet conveyor belt and in particular to a device for conveying printing substrates, sheets of paper, plastic or other materials which are to be printed and/or have been printed, the device including a frame, a plurality of spaced-apart and axially parallel cylindrical rollers which are supported on the frame, one of the rollers being a rotatably drivable drive roller, and the other rollers being freely rotatably supported, and an endless conveyor belt that wraps around all the rollers and in operation is in static-frictional contact with the drive roller.

A device of the foregoing general type heretofore known, for example, from the published European Patent Document EP-A 0 738 680, has some advantages over conventional belt conveyor devices with grippers which make it especially well suited for use in conjunction with electrographic printing units, ink jet printing units, or other printing units which are controllable pixel by pixel.

Belt conveyor devices for printing presses have been developed departing from the basic form thereof wherein two rotatable rollers, one of which is driven, are disposed at a spaced distance from one another corresponding to the conveying distance. A conveyor belt is wrapped around both rollers with initial tension. While printing substrates are fed from a feeder to a delivery along the upper portion of the belt, for multicolor printing in register they pass through a plurality of printing units, at each of which the various basic colors are applied successively. Except for the fact that additional rollers are often provided on the inner side of the conveyor belt in order to support or apply tension to the belt, this basic form has remained unchanged to the present day.

Between the drive roller and the conveyor belt entrained therewith by friction, there is intrinsically a variable amount of slip, which cannot be reduced arbitrarily, especially because it is desirable for the inner side of the conveyor belt to be as smooth as possible so as to keep the friction low in the overall system. In particular, this slip cannot be ignored if high-precision registration is demanded. Heretofore known slip compensating devices are relatively complicated and thus can be considered only for very high-quality printing presses. A proposal is made in the aforementioned published European Patent Document EP-A 0 738 680, for example, that the lagging of the conveyor belt be detected by a sensor and that the printing signals to the printing units be delayed accordingly, so that the accuracy of registration is preserved.

In addition to the aforedescribed problems of slip between the drive roller and the conveyor belt, a problem exists in the heretofore known belt conveyor devices for printing presses that changing a worn or defective conveyor belt is a difficult task. Attempts to solve this problem so far by adhesively fastening or gluing the conveyor belt in the press, partly dismantling the press, or using split shafts, provide only inadequate solutions to the problem.

SUMMARY OF THE INVENTION

It is accordingly an object of the invention to provide a sheet conveyor belt that avoids the foregoing problems of the heretofore known conveyor belts of this general type by minimizing the difficulties in changing worn or defective conveyor belts.

With the foregoing and other objects in view, there is provided, in accordance with the invention, a device for conveying printing substrates, comprising a frame, a plurality of spaced-apart and axially parallel cylindrical rollers supported on the frame, one of the rollers being a rotatably drivable drive roller, and the other rollers being freely rotatably supported, and an endless conveyor belt wrapped around all of the rollers and in operation being in frictional contact with the drive roller, two of the rollers being relatively closely adjacent one another, being spaced apart from one another a distance selected from the group thereof consisting of less than and not considerably greater than the diameter of the drive roller; the drive roller being movable in a direction towards and away from the two spaced apart rollers; and including a retaining device for firmly retaining the drive roller in an operating position wherein an outer side of the conveyor belt rests on the drive roller, the conveyor belt being wrapped around the drive roller over an angle on the order of magnitude of 180°, while the other rollers are in engagement with an inner side of the conveyor belt; and a free space provided on one side of the conveying device for retracting the conveyor belt in axial direction away from the rollers.

In accordance with another feature of the invention, the drive roller has two ends by which the drive roller is supported on respective levers having respective pivots fixed to the frame and spaced apart from the axis of the drive roller above a plane wherein the conveyor belt is disposed, for pivoting the drive roller axially parallel to the other rollers in a direction towards and between the two relatively closely adjacent rollers.

In accordance with a further feature of the invention, the frame has a first and a second side wall substantially parallel to and spaced apart from one another, and between which the rollers extend lengthwise, one end of each of the rollers being supported on the second side wall, at least one self-supporting side part being disposed in vicinity of the first side wall and being secured to cross beams extending as far as the second side wall and being joined thereto; the other end of each of the rollers being supported at a corner or edge of the at least one self-supporting side part; and the first side wall being formed with a recess having a perimeter which is larger than the perimeter of the conveyor belt.

In accordance with an added feature of the invention, two self-supporting side parts are provided in the vicinity of the first side wall, a first self-supporting side part thereof being connected via first cross beams to the second side wall, and a second self-supporting side part thereof being connected via second cross beams to a third side part located in the vicinity of the second side wall; a respective one of the two relatively closely adjacent rollers being supported between the second side wall and the first self-supporting side part, on the one hand, and between the second self-supporting side part and the third self-supporting side part, on the other hand; and the second and third side parts being pivotable jointly about an axis extending parallel to the shafts of the rollers, in the course of which the two relatively closely adjacent rollers are movable away from one another.

In accordance with an additional feature of the invention, the two relatively closely adjacent rollers are disposed in a portion of the conveyor belt whereon the printing substrates are disposed during operation.

In accordance with yet another feature of the invention, the portion of the conveyor belt whereon the printing substrates are disposed during operation includes two flat subportions having planes which intersect in a region between the two relatively closely adjacent rollers, at an angle of less than 180°.

In accordance with yet a further feature of the invention, the retaining device for firmly retaining the drive roller in an operating position includes at least one electrically controllable actuator with which at least one end of the drive roller is adjustable slightly in a direction towards the two relatively closely adjacent rollers and away therefrom; and a position detecting sensor disposed in the vicinity of an edge of the conveyor belt; the position detecting sensor controlling the at least one actuator for regulating straight-ahead travel of the conveyor belt.

In accordance with an alternative feature of the invention, the retaining device for firmly retaining the drive roller in an operating position includes the at least one electrically controllable actuator with which both ends of the drive roller are adjustable independently of one another slightly in the direction towards the two relatively closely adjacent rollers and away therefrom.

In accordance with yet an added feature of the invention, the conveying device serves for conveying printing substrates between printing units of a printing press and/or additional technical printing accessories.

In accordance with yet an additional feature of the invention, the printing units are electrographic printing units and/or ink jet printing units.

In accordance with a concomitant feature of the invention, the conveyor belt is selected from the group thereof consisting of a pneumatic suction belt and an electrostatic belt.

Conveyor belts for printing substrates typically have a suitably prepared outer side to which the sheets adhere well. The coefficient of friction between the conveyor belt and the drive roller, which according to the invention is disposed on the outer side of the conveyor belt, is therefore quite high as well, normally being many times higher than a smooth, low-friction surface of the type preferred for the inner side of the conveyor belt. The large wrap angle about the drive roller by the conveyor belt contributes further to keeping slippage low.

By releasing the retaining device for the drive roller and pivoting the drive roller in the direction towards the two relatively closely adjacent rollers, the conveyor belt can be relaxed to such an extent that it can be retracted from the rollers towards the side, and a new conveyor belt can then be slipped onto the rollers.

The free space for pulling out the conveyor belt can be provided in various ways. For example, each individual roller may be self-supported on a side wall of the frame, for example on self-supporting pipes protruding from the side wall.

Care must be taken that the retraction of the conveyor belt not be hindered by the drive roller and the bearing points thereof, respectively. In the preferred embodiment with a drive roller supported on both ends, the two ends of the drive roller are each supported on a respective lever, which has a pivot point solidly connected to the frame and spaced apart from the axis of the drive roller above the plane of the conveyor belt, as a result of which the drive roller can be pivoted axially parallel to the other rollers in the direction towards the two relatively closely adjacent rollers and therebetween. Consequently, the drive roller, including the levers whereon it is supported, can be pivoted all the way out of range of the conveyor belt.

For reasons of stability, the frame in general has a first and a second side wall, which are substantially parallel to and spaced apart from one another and between which the rollers extend lengthwise, one end of each roller being supported on the second side wall. In such a case, the free space for retracting the conveyor belt is preferably created by providing, in the vicinity of the first side wall, at least one self-supporting side part secured to cross beams which extend as far as the second side wall and are joined thereto; the other ends of each roller being respectively supported at a corner or edge of the at least one self-supporting side part; and the first side wall being formed with a recess having a perimeter larger than the perimeter of the conveyor belt.

The spacing between the two relatively closely adjacent rollers may be selected slightly larger than the diameter of the drive roller, to allow the drive roller to be pivoted between the two closely adjacent rollers, out of range of the conveyor belt. In that case, the wrap angle about the drive roller by the conveyor belt would be somewhat less than 180°.

A larger wrap angle about the drive roller than 180° can be attained in a preferred embodiment by providing that two self-supporting side parts be provided, which are located in the vicinity of the first side wall, a first self-supporting side part thereof being connected via first cross beams to the second side wall and a second self-supporting side part thereof being connected via second cross beams to a third side part that is located in the vicinity of the second side wall; a respective one of the two relatively closely adjacent rollers being supported between the second side wall and the first self-supporting side part, on the one hand, and between the second self-supporting side part and the third self-supporting side part, on the other hand; and the second and third side parts being pivotable jointly about an axis parallel to the shafts of the rollers, in the course of which the two relatively closely adjacent rollers being movable away from one another. In that case, the drive roller may have a diameter that is greater than the spacing between the two relatively closely adjacent rollers, which results in a wrap angle greater than 180°. For changing belts, the subassembly comprising the second and third side parts and carrying part of the rollers is pivoted a slight distance away from the other rollers, after a suitable locking device has been released; after that, the drive roller can be moved through the space between the two closely adjacent rollers, out of range of the conveyor belt. Alternatively, by way of example, one of the two closely adjacent rollers may have displaceable or pivotable bearing points, so that it can be moved away from the other rollers in order to provide space for the drive roller.

The drive subassembly comprising the two relatively closely adjacent rollers and the drive roller may in principle be disposed at any arbitrary point along the circumference of the conveyor belt, or in other words in any portion of the belt between two other rollers. However, in a preferred embodiment, the two relatively closely adjacent rollers are disposed in a portion of the conveyor belt whereon the printing substrates are disposed during operation. The diameter and spacing of the relatively closely adjacent rollers should be selected so that the conveyed printing substrates, by the intrinsic stiffness thereof, span the gap between the closely adjacent rollers. Optionally, a guide or blower device may also be provided, to reinforce the separation of the printing substrate from the conveyor belt when the printing substrate on the conveyor belt reaches the gap.

Disposing the two relatively closely adjacent rollers in a portion of the conveyor belt whereon the printing substrates are disposed in operation creates two successive flat subportions on the upper side of the conveyor belt. This offers greater freedom of design for a printing press or technical printing accessories, because the planes of the two subportions of the conveyor belt can intersect at an angle of less than 180° in the region between the two relatively closely adjacent rollers. When the two subportions intersect at an angle less than 180°, more space-saving arrangements of printing units are possible than for the conventional arrangement of one after the other in a straight line.

An especially important possibility offered by the subportions extending at angles to one another is that the conveyance paths between a first or a last printing unit in the line and any accessory device, such as a feeder, a delivery, or an imprinting unit for applying special colors, addresses, and the like, can be adapted outstandingly to given structural conditions. The usable conveyance path in conventional sheet conveyor belts is normally straight. With heretofore known designs, it would be possible at best to form subportions having conveyor surfaces which form an angle of more than 180°, or in other words an elongated angle between flat partial surfaces of the conveyor belt whereon the printing substrates are fed. However, this would cause the additional problem that the printing substrates could separate from the conveyor belt at the kinking point. In the embodiment of the invention with the drive subassembly on top of the conveyor belt, angles of less than 180° or, in other words, obtuse angles, between the flat partial surfaces of the conveyor belt whereon the printing substrates are fed are possible. In that case, the problem of possible sheet separation does not arise.

In addition to the problems discussed hereinbefore which are solved by the invention, there is a general problem for belt conveyor devices for printing presses in the prior art that, to achieve high-accuracy registration, an exact straight-ahead travel of the conveyor belt must be assured, but this cannot readily be achieved by simple mechanical stabilizing devices. Solutions to this problem are generally complicated. For example, in the aforementioned published European Patent Document EP-A 0 738 680, a roller with a variable diameter on one end is proposed. A signal from a sensor that senses the location of the edge of the belt is used to control the roller diameter, in order to regulate belt travel to a desired set-point position.

The invention, wherein the drive roller must be movable towards and away from the two relatively closely adjacent rollers, offers the additional utility of being able to regulate the straight-ahead travel in a simple manner by fine adjustment of the location of the drive roller. This is preferably attained by providing that the retaining device for firmly retaining the drive roller in an operating position include one or two electrically controllable or triggerable actuators, with which one end of the drive roller or both ends of the drive roller independently of one another are adjustable slightly in the direction towards the two relatively closely adjacent rollers and away therefrom; that a position detecting sensor be disposed in the vicinity of an edge of the conveyor belt; and that the position detecting sensor control or trigger the actuator or actuators for regulating the straight-ahead travel of the conveyor belt.

As already noted hereinbefore, the conveying device according to the invention can be used not only for conveying printing substrates between the printing units of a printing press but also for coupling with technical printing accessories. The invention is especially suitable for printing presses with electrographic printing units, ink jet printing units, or similar printing units, or for example for coupling an electrographic printing press to an accessory ink jet printing unit. Better adhesion of the printing substrates to the conveyor belt can be accomplished in a conventional manner by using a pneumatic suction belt, for example, that is, a perforated belt with suction chests on the inner side of the conveyor belt, or an electrostatic belt with electrostatic sheet adhesion.

Other features which are considered as characteristic for the invention are set forth in the appended claims.

Although the invention is illustrated and described herein as embodied in a sheet conveyor belt, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, wherein:

BRIEF DESCRIPTION OF THE DRAWINGS

FIG. 5a is an enlarged fragmentary view of FIG. 1, showing in detail a retaining device for firmly retaining a drive roller of the invention in an operating position; and FIG. 5b is a view like that of FIG. 5a, showing in detail a retaining device similar to that of FIG. 5a, but having an electrical actuator.

DESCRIPTION OF THE PREFERRED EMBODIMENTS

Figure 1:
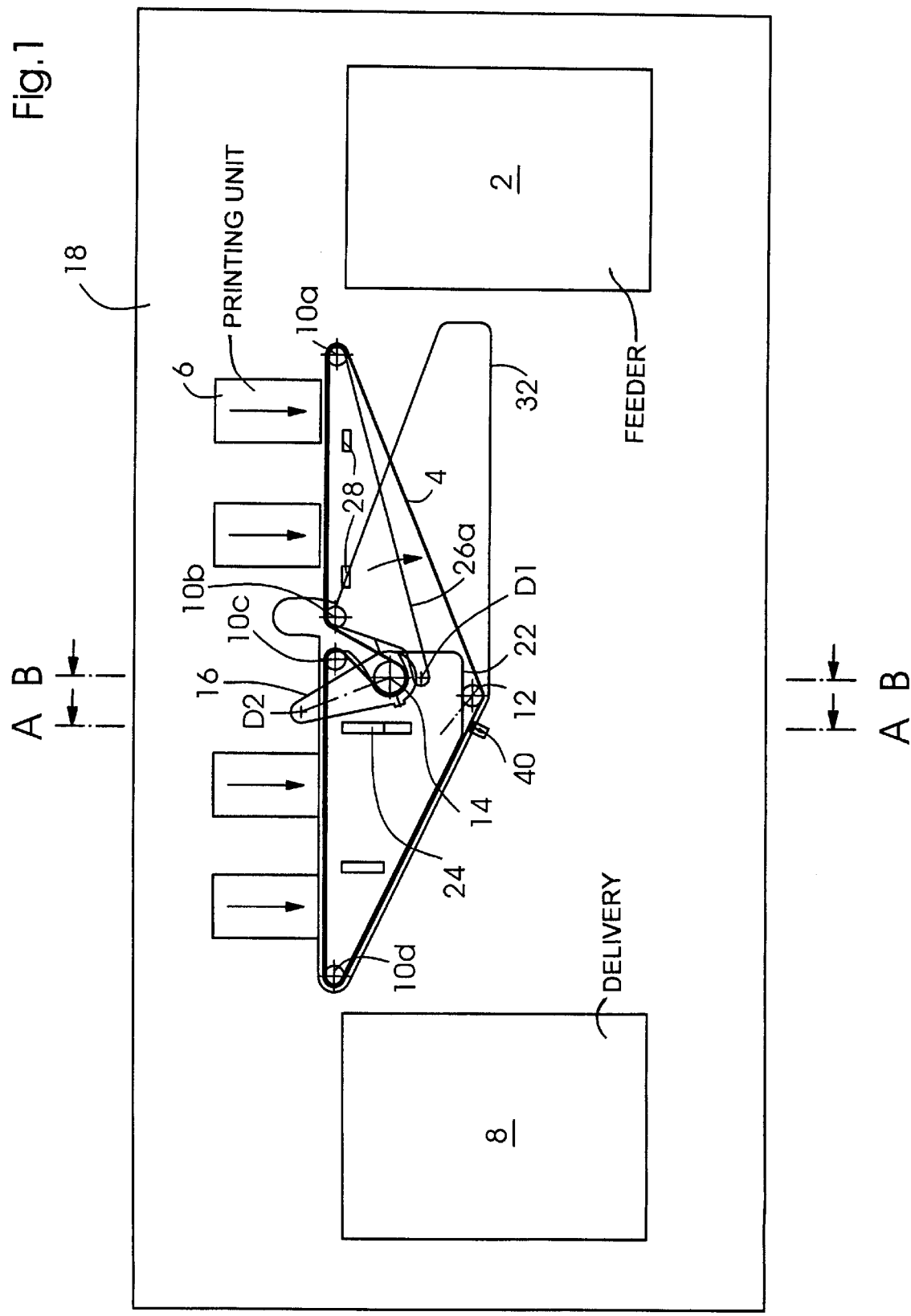
FIG. 1 is a diagrammatic side elevational view of a printing press having an endless sheet conveyor belt.

Referring now to the drawings and, first, particularly to FIG. 1 thereof, there is shown therein diagrammatically, in a printing press, a sheet feeder 2 wherein a sheet is separated, then conveyed on the top of an endless conveyor belt 4 past four printing units 6, and deposited on a sheet pile in a delivery 8.

The endless conveyor belt 4 travels around four deflection rollers 10a to 10d, which are disposed in a row, and around a tension roller 12 disposed therebeneath at a spaced distance therefrom. The middle deflection rollers 10b and 10c in the row of deflection rollers 10a to 10d have a relatively slight spacing, somewhat on the order of magnitude of the respective diameters thereof. Located in the space between the deflection roller 10c and the tension roller 12 is a drive roller 14, that has a diameter greater than the diameter of the deflection rollers 10b and 10c, or the spaced distance therebetween. The conveyor belt 4 forms a loop, that extends downwardly through a gap between the middle deflection rollers 10b and 10c. The conveyor belt 4 wraps around the drive roller 14 thereat at an angle of somewhat more than 180°, specifically with the relatively rougher outer side of the conveyor belt 4, while the smooth inner side thereof rests on all the other rollers. Except for the drive roller 14, which is driven at one end, all the other rollers are free-wheeling rollers. The drive roller 14 has a surface with a coefficient of static friction which is quite high with respect to the outer side of the conveyor belt 4, while all the other rollers have surfaces with a coefficient of static friction that is low with respect to the inner side of the conveyor belt 4. In combination with the large wrap angle about the drive roller 14 by the conveyor belt 4, the result attained thereby is that the conveyor belt 4 follows the motion of the drive roller 14 largely without slippage.

Figure 2:
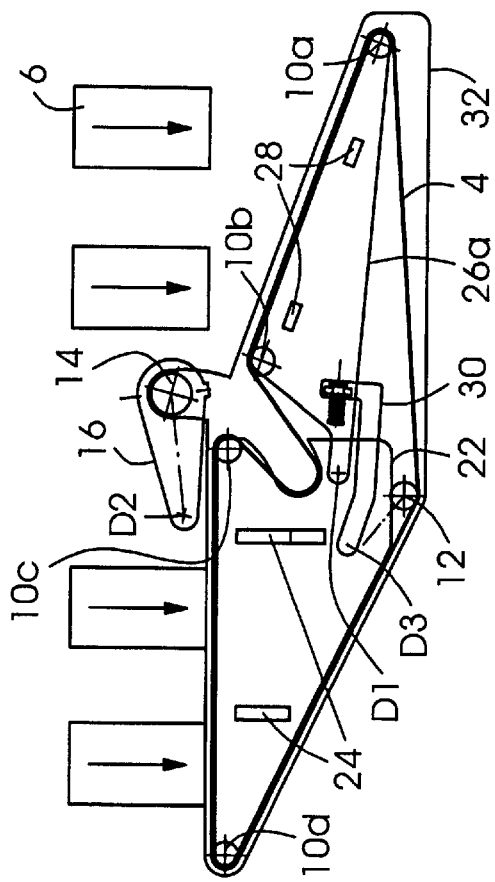
FIG. 2 is a view corresponding to that of FIG. 1, wherein the conveyor belt is shown relaxed and in a position wherein it can be retracted out of the printing press.
Figure 3:
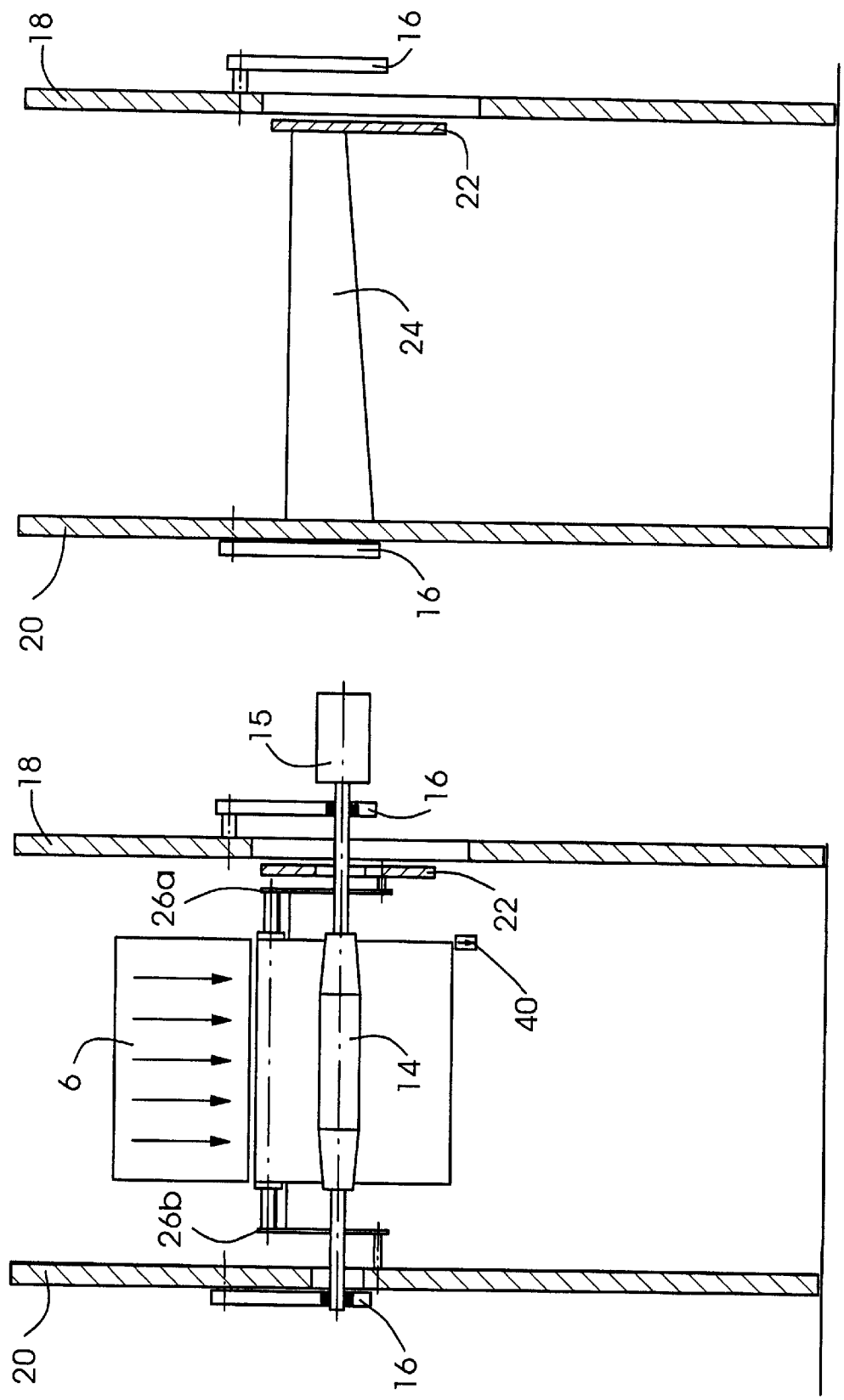
FIG. 3a is a cross-sectional view of FIG. 1 taken along the line A—A in the direction of the arrows.
FIG. 3b is a cross-sectional view of FIG. 1 taken along the line B—B in the direction of the arrows.

The various rollers of the conveyor device are supported in a frame which, on an operating side, has a first or front side wall 18, towards which the viewer faces in FIGS. 1 and 2, and on a drive side has a second or rear side wall 20, which can be seen in FIGS. 3a and 3b. The deflection rollers 10c and 10d are supported in the rear side wall 20 on the drive side and in a substantially smaller intermediate side wall 22 on the operating side. The side part 22 is secured to the rear side wall 20 via elongated cross beams 24. The deflection rollers 10a and 10b are supported in two substantially identical side parts 26a and 26b, of which the side part 26a is located in the vicinity of the front side wall 18, and the side part 26b is located in the vicinity of the rear side wall 20, as can be seen in FIG. 3b. Also shown in FIG. 3b is a motor 15 for the drive roller 14.

As is apparent from FIG. 1, the two side parts 26a and 26b are joined together via elongated cross beams 28 and can be pivoted, in the direction of the arrow shown, about a pivot axis D1 that is parallel to all the rollers. The drive roller 14 is supported on levers 16, which are each supported on a respective side wall 18 and 20. The bearing points of the levers 16 on the frame are located on a pivot axis D2, which is located somewhat above the upper belt portion of the conveyor belt 4. The drive roller 14 is firmly retained in the operating position shown in FIG. 1 by a retaining device, not shown in FIG. 1, that engages with the levers 16.

When the subassembly formed of the side parts 26a and 26b and the cross beams 28 is pivoted downwardly, after suitable locking devices have been released, into the removal position for the conveyor belt 4 shown in FIG. 2, the conveyor belt 4 relaxes. Once the retaining device for the drive roller 14, which is formed of two levers 30 shown in FIG. 2 and described in further detail hereinbelow, is released, the drive roller 14 can be pivoted in the direction of the arrow shown in FIG. 1 about the pivot point D2 thereof out of the range of the conveyor belt 4, so that it is then located in the position thereof shown in FIG. 2. As seen in FIG. 2, the pivoting of the side parts 26a and 26b enlarges the gap between the middle deflection rollers 10b and 10c to such an extent that the drive roller 14 can pass through the space between the deflection rollers 10b and 10c.

Figure 4:
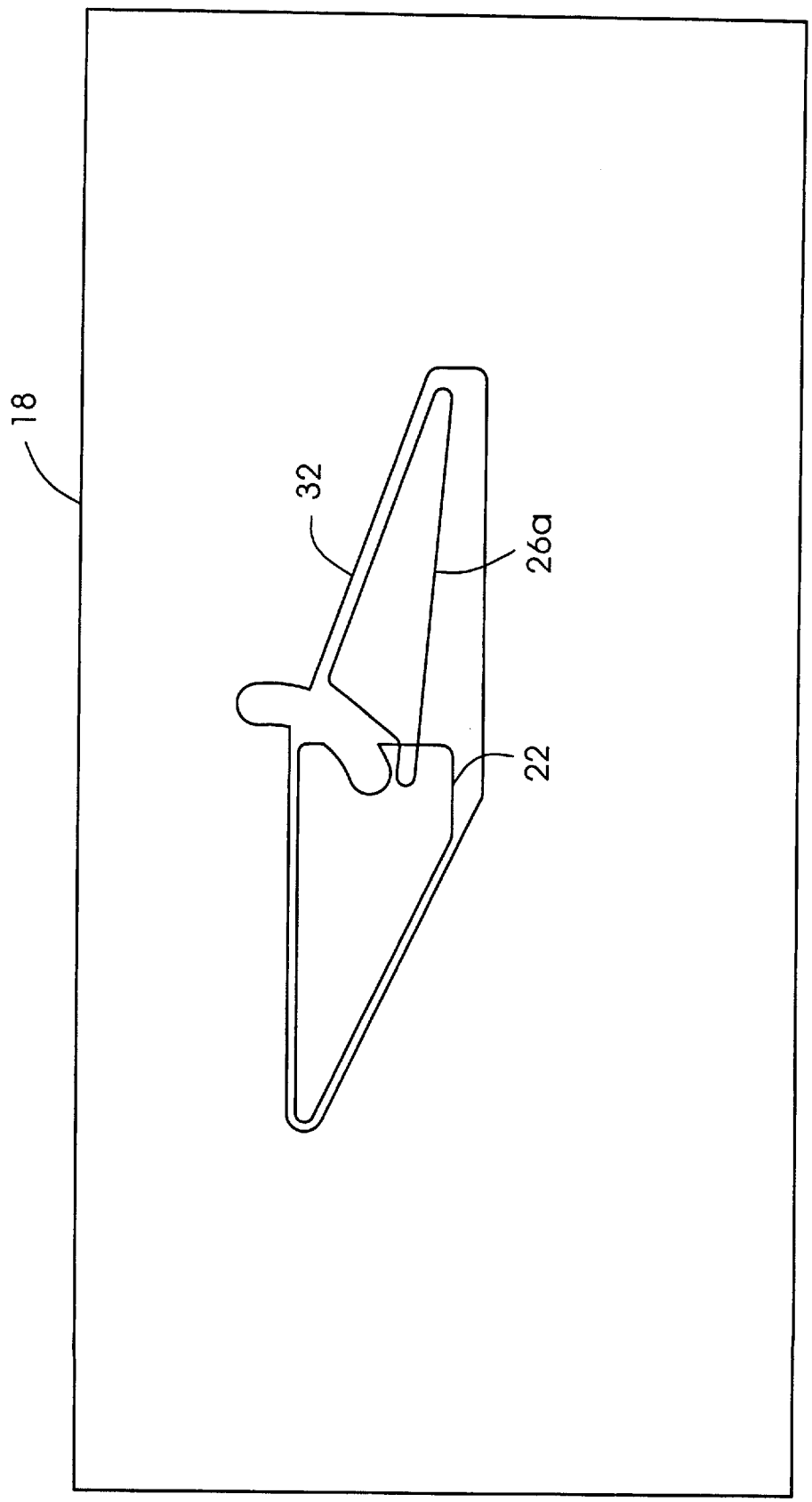
FIG. 4 is an isolated side elevational view of of a side wall and two corresponding side parts of a frame of the belt conveyor device according to the invention.

The side parts 22 and 26a, together, are smaller than the perimeter of the conveyor belt 4, and a recess 32 is formed in the front side wall 18, the outline or perimeter of the recess 32 substantially following the external shape of the side parts 22 and 26a, or the shape or perimeter of the conveyor belt 4, in the removal position but being slightly larger than that, as can be best seen in FIG. 4. In the removal position, the conveyor belt 4 can be pulled away through the recess 32 to the control side.

The levers 30 for restraining the levers 16 whereon the drive roller 14 is supported are shown in greater detail in FIGS. 5a and 5b. In the operating position of the drive roller 14, one lever 30 having a pivot point that is located at D3, restrains one of the levers 16, in that a spring 34 presses the lever 16 against a stop spindle 36 (FIG. 5a).

The other lever 30, on the other side of the frame, also includes an actuator 38, with which the stop spindle 36 can be adjusted (FIG. 5b). Optionally, both levers 30 may be equipped with an actuator of this type.

The pivotable support of the drive roller 14 in the levers 16, in conjunction with the actuator 38 shown in FIG. 5b, makes it possible to achieve simple straight-ahead or linear travel regulation of the conveyor belt 4. To that end, an optical sensor 40 (FIG. 1 and FIG. 3b) is located near one edge of the conveyor belt 4 and detects the location of the edge of the belt. If the conveyor belt 4 becomes skewed, the axis of the drive roller 14 will be adjusted obliquely (nonparallel) to the other rollers via a rotation of the stop spindle 36 based upon the signal of the sensor 40, so that the conveyor belt 4 is then driven back into the center of the press. Reinforced by a slightly cambering or spherical embodiment of the drive roller 14, as shown in FIG. 3b, there results a very accurate, reliable straight-ahead or linear travel regulation at relatively little expense.

I claim:

1. A device for conveying printing substrates, comprising:
   a frame having a first side wall and a second side wall substantially parallel to and spaced apart from one another and forming a free space;
   a plurality of spaced-apart and axially parallel cylindrical rollers supported on said frame, one of said rollers being a rotatably drivable drive roller, and other rollers of said rollers being freely rotatably supported;
   at least three side parts disposed in a vicinity of said first side wall, a first of said three side parts connected to said second side wall with first cross beams, and a second of said three side parts connected to a third of said three side parts located in vicinity of said second side wall through second cross beams;
   an endless conveyor belt having an inner side and an outer side, said conveyor belt wrapped around all of said rollers and in operation being in frictional contact with said drive roller, two of said rollers being relatively closely adjacent one another and being spaced apart from one another a distance selected from the group consisting of less than and not considerably greater than a diameter of said drive roller; said drive roller being movable in a direction towards and away from said two relatively closely adjacent rollers; and
   a retaining device for firmly retaining said drive roller in an operating position wherein said outer side of said conveyor belt rests on said drive roller,
   said conveyor belt being wrapped around said drive roller over an angle of approximately 180°,
   said other rollers being engaged with said inner side of said conveyor belt,
   said free space formed for retracting said conveyor belt away from said rollers along an axial direction of said rollers,
   said rollers extending lengthwise between said first side wall and said second side wall, one end of each of a plurality of said other rollers being supported on said second side wall, another end of each of said plurality of said other rollers being supported by one of said at least three side parts at a corner or edge of said one of said at least three side parts,
   said first side wall being formed with an opening having a perimeter larger than a perimeter of said conveyor belt,
   one of said two relatively closely adjacent rollers being supported between said second side wall and said first side part, and the other of said two relatively closely adjacent rollers supported between said second side part and said third side part,
   said second and third side parts being pivotable jointly about an axis extending parallel to shafts of said rollers wherein, in the course of pivoting, said two relatively closely adjacent rollers are movable away from one another.

2. The conveying device according to claim 1, wherein said drive roller has two ends by which said drive roller is supported on respective levers having respective pivots fixed to said frame and spaced apart from the axis of said drive roller above a plane wherein said conveyor belt is disposed, for pivoting said drive roller axially parallel to said other rollers in a direction towards and between said two relatively closely adjacent rollers.

3. The conveying device according to claim 1, wherein said two relatively closely adjacent rollers are disposed in a portion of the conveyor belt whereon the printing substrates are disposed during operation.

4. The conveying device according to claim 3, wherein said portion of said conveyor belt whereon the printing substrates are disposed during operation includes two flat subportions.

5. The conveying device according to claim 1, wherein said retaining device for firmly retaining said drive roller in an operating position includes at least one electrically controllable actuator with which at least one end of said drive roller is adjustable slightly in a direction towards said two relatively closely adjacent rollers and away therefrom; and a position detecting sensor disposed in the vicinity of an edge of said conveyor belt; said position detecting sensor controlling said at least one actuator for regulating straight-ahead travel of said conveyor belt.

6. The conveying device according to claim 5, wherein said retaining device for firmly retaining said drive roller in an operating position includes an electrically controllable actuator with which both ends of said drive roller are adjustable independently of one another slightly in said direction towards said two relatively closely adjacent rollers and away therefrom.

7. In combination with a printing press having a plurality of printing units and technical printing accessories, a conveying device for conveying printed substrates, comprising:
a frame having a first side wall and a second side wall substantially parallel to and spaced apart from one another and forming a free space;
a plurality of spaced-apart and axially parallel cylindrical rollers supported on said frame, one of said rollers being a rotatably drivable drive roller, and other rollers of said rollers being freely rotatably supported;
at least three side parts disposed in vicinity of said first side wall, a first of said three side parts connected to said second side wall with first cross beams, and a second of said three side parts connected to a third of said three side parts located in vicinity of said second side wall through second cross beams;
an endless conveyor belt having an inner side and an outer side, said conveyor belt wrapped around all of said rollers and in operation being in frictional contact with said drive roller, two of said rollers being relatively closely adjacent one another and being spaced apart from one another a distance selected from the group consisting of less than and not considerably greater than a diameter of said drive roller; said drive roller being movable in a direction towards and away from said two relatively closely adjacent rollers; and
a retaining device for firmly retaining said drive roller in an operating position wherein said outer side of said conveyor belt rests on said drive roller,
said conveyor belt being wrapped around said drive roller over an angle of approximately 180 degrees, said other rollers being engaged with said inner side of said conveyor belt,
said free space formed for retracting said conveyor belt away from said rollers along an axial direction of said rollers,
said rollers extending lengthwise between said first side wall and said second side wall, one end of each of a plurality of said other rollers being supported on said second side wall, another end of each of said plurality of said other rollers being supported by one of said at least three side parts at a corner or edge of said one of said at least three side parts,
said first side wall being formed with an opening having a perimeter larger than a perimeter of said conveyor belt,
one of said two relatively closely adjacent rollers being supported between said second side wall and said first side part, and the other of said two relatively closely adjacent rollers supported between said second side part and said third side part,
said second and third side parts being pivotable jointly about an axis extending parallel to shafts of said rollers wherein, in the course of pivoting, said two relatively closely adjacent rollers are movable away from one another;
wherein said conveying device is disposed in the printing press to convey printing substrates between at least one of the group consisting of the printing units and the technical printing accessories.

8. The conveying device according to claim 7, wherein the printing units are at least one of the group consisting of electrographic printing units and ink jet printing units.

9. The conveying device according to claim 1, wherein said conveyor belt is selected from the group thereof consisting of a pneumatic suction belt and an electrostatic belt.

10. A device for conveying printing substrates, comprising:
a frame comprising two parallel walls, said frame forming a free space comprising an opening in one of said walls;
a plurality of spaced-apart and axially parallel cylindrical rollers supported on said frame, one of said rollers being a rotatably drivable drive roller, and other rollers of said rollers being freely rotatably supported, two of said rollers being relatively closely adjacent one another, being spaced apart from one another a distance selected from a group consisting of less than and not considerably greater than a diameter of said drive roller said drive roller being movable in a direction towards and away from said two relatively closely adjacent rollers;
an endless conveyor belt having an edge, an inner side, and an outer side, said conveyor belt wrapped around all of said rollers and being in frictional contact with said drive roller in operation, said conveyor belt being wrapped around said drive roller over an angle of approximately 180°, said free space formed for retracting said conveyor belt away from said rollers along an axial direction of said rollers, said other rollers being engaged with said inner side of said conveyor belt;
a retaining device for firmly retaining said drive roller in an operating position wherein said outer side of said conveyor belt rests on said drive roller, said retaining device having at least one electrically controllable actuator with which at least one end of said drive roller is adjustable slightly in a direction towards said two relatively closely adjacent rollers and away therefrom; and
a position detecting sensor disposed in vicinity of said edge of said conveyor belt; said position detecting sensor controlling said at least one actuator for regulating straight-ahead travel of said conveyor belt.

* * * * *